United States Patent [19]

Wiklund

[11] 3,898,007
[45] Aug. 5, 1975

[54] DEVICE FOR ELECTRO-OPTICAL DISTANCE MEASUREMENT

[75] Inventor: Klas Rudolf Wiklund, Taby, Sweden

[73] Assignee: Aga Aktiebolag, Sweden

[22] Filed: Nov. 27, 1972

[21] Appl. No.: 309,887

[30] Foreign Application Priority Data
Nov. 25, 1971 Sweden............................ 15074/71

[52] U.S. Cl. .................. 356/4; 356/5; 250/205
[51] Int. Cl. ............................................ G01c 3/08
[58] Field of Search ........ 356/4, 5; 250/217 R, 205; 343/7.5

[56] References Cited
UNITED STATES PATENTS

| | | | |
|---|---|---|---|
| 2,530,418 | 11/1950 | Alvarez | 343/7.5 |
| 3,022,702 | 2/1962 | Pocher | 356/5 |
| 3,076,378 | 2/1963 | Biedermann et al. | 356/4 |
| 3,123,724 | 3/1964 | Schrenk et al. | 250/217 R |
| 3,608,547 | 9/1971 | Sato et al. | 356/4 |
| 3,679,307 | 7/1972 | Zoot et al. | 356/4 |
| 3,699,347 | 10/1972 | Buchan et al. | 250/217 R |

Primary Examiner—Maynard R. Wilbur
Assistant Examiner—S. C. Buczinski
Attorney, Agent, or Firm—Lerner, David, Littenberg & Samuel

[57] ABSTRACT

A device for electro-optical distance measurement comprising a signal transmitter for modulated electromagnetic waves of the type included in the transmission range of the eye, such as ultraviolet, infrared and visible light, and a receiver with a detector which is sensitive to such waves, and an alignment device, which makes it possible by means of the eye to align the device to the far point of the measuring distance, and analyzers connected to the transmitter and the receiver for the evaluation of the distance measured, wherein the detector and the signal transmitter are linked together by means of a control circuit by means of which the mean level of the signal received is adapted to control the mean intensity of the signal transmitted so that the mean level of the signal received is always maintained within a certain range of values sufficient for the detector independently of the length of the measuring distance, so that any unnecessary radiation effect on the aligning eye is prevented.

3 Claims, 3 Drawing Figures

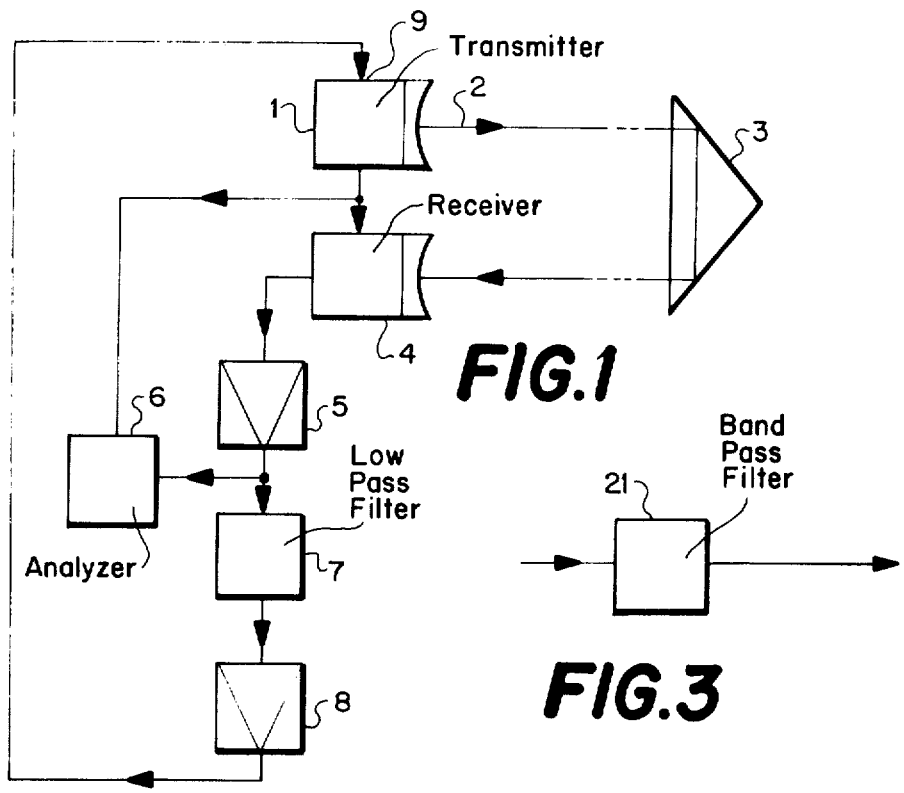
FIG.1
FIG.3
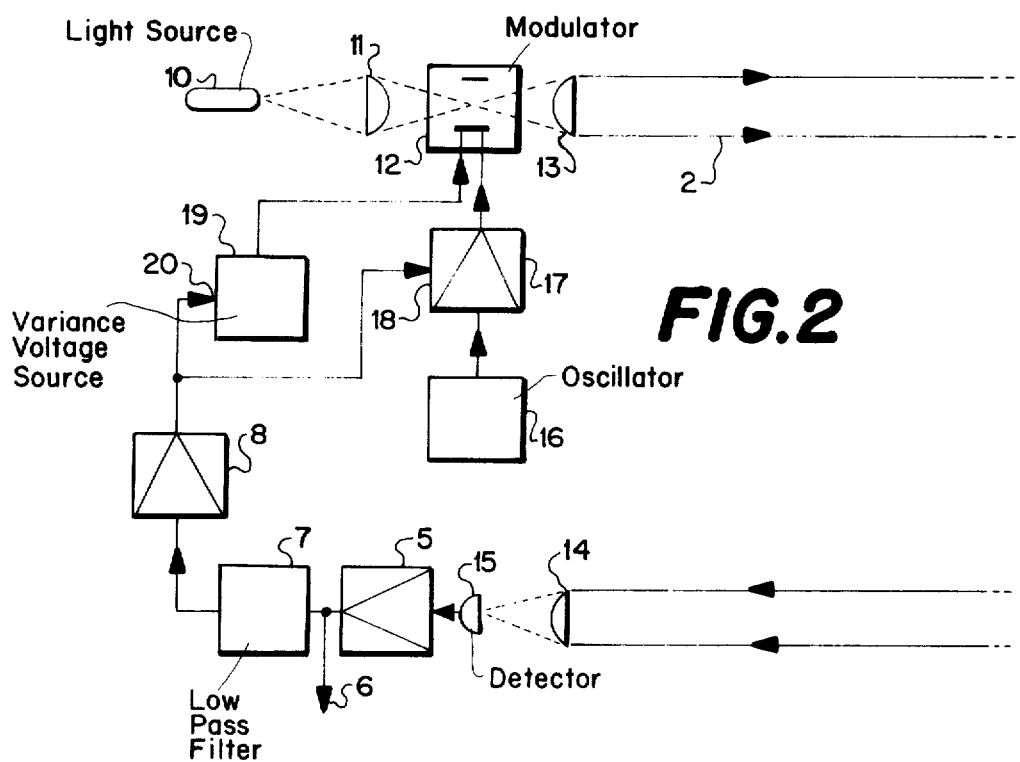
FIG.2

DEVICE FOR ELECTRO-OPTICAL DISTANCE MEASUREMENT

CONVENTION PRIORITY

This is a convention application based upon Swedish Patent Application No. 15074/71, filed Nov. 25, 1971 by Aga Aktiebolag.

Such distance measuring equipment sends out modulated electromagnetic waves, which frequently are adapted to be reflected at the point up to which the distance is to be measured, whereupon the electromagnetic waves return to a receiver arranged in the distance measuring equipment, provided with a detector sensitive to such waves. The receiver can of course be installed at the other end point of the measuring distance. This makes the measuring procedure complicated, however, since active instruments have to be installed at two points, situated sometimes at a great distance from one another. The invention relates further in particular to such distance measuring equipment where the electromagnetic waves transmitted consist of ultraviolet, infrared or visible light. The electromagnetic waves of this type have in common that they are situated within the transmission range of the eye.

When electro-optical instruments are used at different distances, the strength of the incoming signal varies strongly with varying distance between measuring instrument and reflector. Since the light spread by the square with the direction of the distance to the reflector and by the square with the distance from the reflector back to the receiver (presuming that the reflector has a small area compared with the beam), the intensity decreases with the measuring distance to the fourth power. This leads to a demand for high linearity of the receiving-detecting element, e.g. a photo-multiplier. It also brings about a great difference of the effect received by the eye. The eye will be exposed hereby to an undesirable radiation effect which it may find difficult to protect itself against for example by means of pupil reaction and eye movements which should be able to distribute the light intensity over the eye ground. This is especially noticeable with for example ultraviolet and infrared rays, to which the eye does not react but by which it can nevertheless be damaged. This effect is enhanced moreover through the strong optical system which is used for increasing the range for great distances.

The present invention aims in particular at preventing the occurrence of eye discomfort. This is accomplished in that the signal transmitted from the transmitter is adapted with regard to its effect to the distance which is to be measured. Such an adaptation also brings with it the advantage that the disappearing transmitter effect can be reduced and that the dynamic range of the receiver unit can be reduced.

A usual type of electro-optical distance measuring equipment uses visible light owing to the fact that the transmitter and the receiver can then readily with the help of a telescopic sight be aligned on the reflector at a far point of the measuring distance.

With such distance measuring equipment it is possible to measure distances up to several tens of kilometres. The transmitter effect is then usually adapted to this longest possible distance, in doing which the transmitter effect is unnecessary high at the measurement of shorter distances. At the alignment of the transmitter and the receiver by means of a telescopic sight, as mentioned above, the light effect capable of meeting the eye was strong at a relatively short distance. Moreover, this effect was increased by the optical system of the telescopic sight. By means of the device in accordance with the invention it was possible to a very large part to eliminate this risk of discomfort for the person aligning the instrument.

In the following description as an example distance measuring equipment will be dealt with which transmits visible light, since the equivalence with distance measuring equipment transmitting ultraviolet or infrared light is very considerable. The light source in the distance measuring equipment which transmits visible light can for example be an ordinary filament lamp, a mercury vapour lamp, a light diode or a continuous laser.

The characteristics of the invention will be evident from the enclosed patent claims.

The invention will be explained in greater detail with the help of the enclosed drawing, in which FIG. 1 shows an example of an electro-optical distance measuring equipment in accordance with the invention, and FIG. 2 shows in a more detailed manner similar distance measuring equipment. FIG. 3 shows a further embodiment of a detail in FIG. 2.

In FIG. 1 the transmitter of the distance measuring equipment is marked 1. This transmitter is assumed to contain on the one hand the light source, on the other hand the modulating signal source. The light source in the transmitter 1 can be for example a filament lamp, a mercury vapour lamp or a laser, the transmitter also being assumed to contain a modulation unit. This modulation unit modulates with the help of the signal from the modulating signal source the light from the light source, the signal 2 emitted from the transmitter 1 being constituted of modulated electromagnetic waves. The transmitted signal 2 is reflected for example on a prism 3 at the far end point of the measuring distance and reflected to the receiver 4.

The receiver 4 contains a detector for the conversion of the visible light to an electric signal. This detector may consist for example of a photomultiplier. From the transmitter 1 the modulating signal is conducted via a connection also to the receiver 4 for modulation of the photomultiplier.

The signal so given off from the photomultiplier is fed to an amplifier 5 and from there further to the analyzer 6 of the distance measuring equipment. To this analyzer 6 is also fed the modulation signal from the transmitter 1. The analyzers 6 may be constituted in many different manners and as an example may be given the setup according to the U.S. Pat. No. 3,488,585.

The signal from the receiver, beside being conducted to the analyzers 6, is also taken via a low-pass filter 7 and an amplifier 8 back to a regulating input 9 on the transmitter 1. The low-pass filter 7 here has the purpose of filtering the high frequency light from the regulating signal.

The regulating signal is a function of the mean level of the electromagnetic waves arriving at the receiver 4. The regulating signal is adapted so that it influences the mean intensity in the electromagnetic waves transmitted from the transmitter. in the case which is described here the electromagnetic waves consist of visible light and the regulating signal is then a function of the mean intensity of the light which strikes the receiver.

The regulating signal in accordance with the invention is adapted to control the mean intensity of the outgoing light so that the intensity of the incoming light is maintained within a certain range. If the distance measuring equipment is used for measuring a large distance the reflecting prisms 3 will consequently be located a long way away from the transmitter and receiver. The transmitter is regulated so that the mean intensity of the light transmitted will be sufficient for the light incident on the receiver to have an intensity which is so great that an optimum setting of the working range is obtained, so that the signal-to-noise ratio becomes as large as possible. If now an appreciably shorter distance is to be measured it is obvious that the light intensity transmitted will be unnecessarily large. With the device in accordance with the invention this intensity will be reduced to a value which is fully sufficient to enable the detector in a fully satisfactory manner to convert the light signal to an electric signal.

If the light source is a light diode there is no need for a special modulation unit but the working current of the light diode can be varied directly with the help of the modulation signal.

In FIG. 2 is shown how the aforementioned regulation is performed in the case where the light source consists of a lamp or laser. The light source is designated 10 in FIG. 2, and from this source light is transmitted through a convergent lens 11 to a modulator 12. This modulator can be for example a Kerr cell or a Pockels modulator. After the passage through the modulator the divergent light bundle outgoing from the same is collected by a lens 13 and is transmitted as a beam 2 to a reflector situated at the end point of the distance looked for. The beam reflected here turns back and passes a convergent lens 14 to fall thereafter on a detector 15 in the receiver unit. This detector can be constituted for example of a photomultiplier, avalance diode or photodiode. The light is converted by the detector to an electric signal which via an amplifier 5 on the one hand is conducted to the analyzer 6 and on the other hand through a low-pass filter 7 and an amplifier 8 to the transmitter. The function of the latter elements was described in connection with FIG. 1. In FIG. 2 the connection between the transmitter and the receiver, and the analyzer have not been drawn in.

If it is assumed that the modulator 12 is a Kerr cell the modulation takes place as a result of a modulation signal being passed to this Kerr cell which modulation signal consists on the one hand of a modulation voltage and on the other hand of a bias voltage. The modulation voltage is generated by an oscillator 16. This modulation voltage is made to pass through an amplifier 17 to the modulator 12. The amplifier 17 for the modulation voltage is provided with a regulating input 18. By feeding a regulating signal to this regulating input 18 the amplitude of the modulation voltage can be regulated.

The bias voltage of the modulation signal is generated by a variable d.c. voltage source 19 provided with a regulating input 20.

The mean intensity of the light signal going out from the modulator can be regulated with the help of the bias voltage from the bias voltage source 19. The d.c. voltage level about which the modulation takes place can thus be regulated in relation to the intensity of the signal received. The choice of the degree of modulation is made appropriately so, moreover, that an optimum relation is chosen at the distance which gives the worst signal-to-noise ratio in the receiver part. If moreover the limitation is included that the modulation shall always have the same sign, any undesirable harmonics can be suppressed in a simple manner. By regulating, beside the d.c. voltage level in the modulation signal, also the modulation voltage in relation to the mean intensity received a greater dynamic range is achieved.

To increase the sensitivity of the detector for the information-carrying beam an optical band pass filter can be arranged in front of the detector so that the radiation from the environment is filtered out.

FIG. 3 shows an alternative embodiment of the filter device 7 in FIG. 2. The signal from the amplifier 5 is conducted to a band pass filter 21 and to a low-pass filter 22 with a rectifier 23 and then further to the regulation inputs of the modulation source. At the output of the filter 22 as a result an envelope is obtained of the information-carrying signal from the receiver.

By means of the device in accordance with the invention a method is obtained for the automatic realization of an adaptation to a necessary and sufficient signal level through an evaluation of the mean light intensity which strikes the detector in the receiver and returning the same to the modulating unit.

The distance measuring equipment of the type described here often operates with a very narrow light bundle which is transmitted towards a reflector. However, turbulence in the air may in the case of long distances cause small changes in direction of the light beam. In the case of small reflectors only the boundary rays will then strike the same, and the effect of the received light will be too small for an accurate distance measurement to be made. In the device in accordance with the invention in such a case the strength of the transmitted beam will automatically be increased when only the boundary rays strike the reflector, since the receiver will then via the regulating signal demand an increase in the light intensity. When the light beam, because of diminishing air turbulence, is pointing once more directly on the reflector, the intensity of the light received increases accordingly and the receiver, via the regulating signal, now controls the transmitter so that the intensity transmitted by it is reduced. In this manner the device in accordance with the invention provides a certain compensation for air turbulence.

I claim:

1. A device for electro-optical distance measurement comprising a signal transmitter for modulated electromagnetic waves in the transmission range of the eye, a receiver with a detector which is sensitive to said waves, an analyzer connected to the transmitter and the receiver for the evaluation of the distance measured, said detector and signal transmitter being linked together by means of a control circuit by which the mean level of the signal received in said detector is adapted to control the mean intensity of the signal transmitted by said signal transmitter so that the mean level of the signal received is always maintained within a certain range of values sufficient for said detector independently of the length of the measuring distance, wherein said control circuit is operative such that the mean level of the information-carrying frequency of the signal received controls the mean intensity of the signal transmitted by said signal transmitter.

2. A device in accordance with claim 1 wherein said modulation of the signal transmitted by said signal transmitter is accomplished by a modulating voltage with the mean intensity of the signal transmitted by said signal transmitter being controlled by the modulating voltage in accordance with the signal received by said detector.

3. A device in accordance with claim 2, wherein the signal received by said detector also controls the amplitude of the modulating voltage.

* * * * *